Sept. 11, 1962  J. C. STURMAN  3,053,991
DUAL VOLTAGE POWER SUPPLY
Filed July 7, 1960
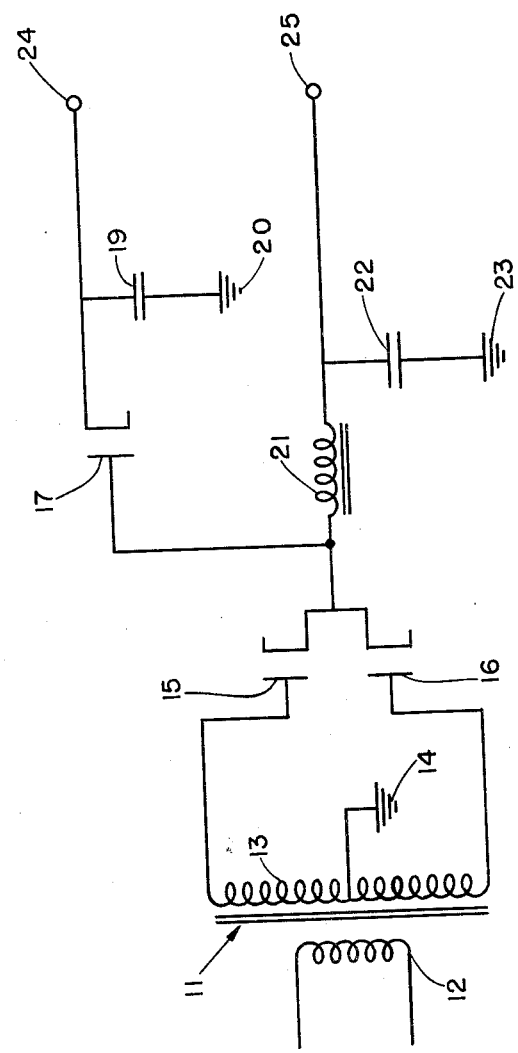
INVENTOR
JOHN C. STURMAN
BY
ATTORNEY.

United States Patent Office 3,053,991
Patented Sept. 11, 1962

3,053,991
DUAL VOLTAGE POWER SUPPLY
John C. Sturman, 4034 W. 163rd St., Cleveland, Ohio
Filed July 7, 1960, Ser. No. 41,457
3 Claims. (Cl. 307—82)
(Granted under Title 35, U.S. Code (1952), sec. 266)

The invention described herein may be manufactured and used by or for the Government of the United States of America for governmental purposes without the payment of any royalties thereon or therefor.

The purpose of this invention is to provide a highly efficient device which produces two different output voltages for a direct current power supply.

Previous to the present invention, one of the methods used to provide two different output voltages for a D.C. power supply was to use a tapped power transformer with a separate rectifier and filter. The disadvantage of this method is that a special transformer with proper tap is needed in order to get the various voltages. An additional disadvantage is that it is necessary to have a plurality of rectifying and filtering means for each voltage obtained.

A second presently-existing method of accomplishing the purpose of the present invention is the use of voltage dropping resistors. The disadvantage of this method is that there is poor regulation as to the output voltage and such method is wasteful of the power. In accordance with the invention, there is provided a power supply arrangement including a power transformer having a primary winding, a core, and a secondary winding. The power output of the transformer is rectified by a pair of diodes and is filtered by a conventional choke-input filter which is composed of an inductor and condenser to provide what is known as a medium voltage output. The rectified output from the diodes is also passed through a second diode which conducts on the peak of the full wave rectified signal and charges a capacitor to the peak secondary voltage of the transformer. The output from this second charged capacitor provides the high voltage output which may be about 40 percent above the medium voltage supply from the conventional choke filter.

It is an object of this invention to provide a dual voltage power supply having high electrical efficiency.

An additional object of the invention is to provide a dual voltage power supply possessing fewer and smaller parts than are required for a comparable supply using a tapped transformer.

Another object of the invention is to provide a dual unidirectional voltage power supply having low ripple since both high and medium voltage outputs are full wave rectified.

A further object of the invention is to provide a dual voltage power supply having good regulations at the output.

Other objects and many attendant advantages of the present invention will be apparent from the following detailed description when taken together with the accompanying drawing in which:

The single FIGURE is a schematic diagram of the dual voltage power supply in accordance with the invention.

Referring now to the drawing, there is shown a dual voltage power supply including a power transformer 11 such, for example, as the set-up-kind, having a primary winding 12 connectable to an alternating current source, and secondary winding 13 having an intermediate ground connection 14. The alternating current output of the power transformer 11 is connected to the anodes of and rectified by diodes 15 and 16 which may be vacuum, gas or semiconductor type diodes the cathodes of which are commonly connected at 26.

A portion of the unfiltered rectified unidirectional current leaving the two diodes then passes through a conventional choke-input filter composed of an inductor 21 and condenser 22 which has a conventional ground 23. As a result of the choke-input filter, a medium voltage output 25 is obtained. An additional portion of the unfiltered rectified current leaving the diodes 15 and 16 passes through a second branch circuit which comprises a diode 17 which conducts on the peaks of the full wave rectified alternating current from diodes 15 and 16, charging a capacitor 19 which has a conventional ground 20 to the peak voltage of the transformer. This provides a high voltage output 24. An advantage of the configuration is that the diode 17 requires a peak inverse voltage rating only equal to one-half the peak voltage of the transformer secondary 13. It is pointed out that for maximum voltage at the high voltage output 24, it is desirable to use a high conductance diode such as silicon or germanium semiconductor diode for diode 17 shown.

Obviously, many modifications and variations of the present invention are possible in the light of the above teachings. It is, therefore, to be understood that within the scope of the appended claims the invention may be practiced other than as specifically described.

What is claimed:

1. In a dual voltage supply arrangement, in combination, a transformer having a primary and secondary winding, a pair of diodes respectively connecting opposite ends of said secondary to a common terminal, a first circuit directly connected to said common terminal comprising a choke-input filter and a second circuit directly connected to said common terminal comprising a diode and a capacitor.

2. In a dual voltage supply arrangement, in combination, a transformer having a primary and secondary winding, a pair of diodes respectively connecting opposite ends of said secondary to a common terminal, a first circuit directly connected to said common terminal comprising an inductor and a capacitor for providing a first output voltage, and a second circuit directly connected to said common terminal comprising a diode and a capacitor for providing a second output voltage of a magnitude greater than said first output voltage.

3. A dual potential energy supply comprising a transformer having a primary winding and a secondary winding, an intermediate point on said secondary winding being connected to a point of fixed reference potential; a full wave rectifier element having the anodes thereof connected across said secondary winding and the cathodes thereof commonly connected; first circuit means for providing a unidirectional output including a diode and a first capacitor, one side of said first capacitor being connected to the cathode of said diode and the other side of said first capacitor being connected to said fixed reference potential point, the anode of said diode being directly connected to said commonly connected cathodes; and second circuit means for providing another unidirectional output including an inductor and a second capacitor, one side of said second capacitor being connected to one side of said inductor and the other side thereof being connected to said fixed reference potential point, the other side of said inductor being directly connected to said commonly connected cathodes.

References Cited in the file of this patent
UNITED STATES PATENTS
2,789,266    Neal _____ Apr. 16, 1957